UNITED STATES PATENT OFFICE.

HENRY ERNEST FRY, OF GODMANSTONE, DORCHESTER, ENGLAND, ASSIGNOR TO CHARLES EDWARD DE WOLF, OF LONDON, ENGLAND.

TREATMENT OF SEED-GRAIN.

1,106,039. Specification of Letters Patent. Patented Aug. 4, 1914.

No Drawing. Application filed October 10, 1913. Serial No. 794,535.

*To all whom it may concern:*

Be it known that I, HENRY ERNEST FRY, a subject of the King of Great Britain, residing at Godmanstone, Dorchester, Dorset, England, have invented new and useful Improvements in the Treatment of Seed-Grain, of which the following is a specification.

The object of this invention is the treatment of seed-grain more particularly the cereals and cotton seed (hereinafter called grain) before being sown by an electrochemical process in order to render them more productive.

According to this invention the grain is placed in a solution of a chemical or organic manure through which a current of electricity is passed.

Some manures are insoluble in, or partly insoluble in water, in which cases they are held in suspension in the water, but for the purposes of this specification such mixtures are called solutions.

The treatment is varied according to the kind of grain which is treated.

It is preferred to use a solution containing ten per cent. of nitrate of soda or sulfate of ammonia with four hours treatment for wheat and barley, five hours for oats, and six hours for maize and cotton seed.

A low tension direct current from a secondary battery (or other source of electricity which can yield a steady and continuous supply) of one half ampere at the lowest voltage which is necessary to carry the current through the solutions is preferably used.

A combination of solutions may be employed the best results being obtained when the solutions are nitrogenous.

With some grain especially maize and cotton seed, a ten per cent. solution of nitric acid may be used.

A convenient mode of applying the process is to place a solution and the grain in a rectangular water tight tank made of wood or other suitable material, at the ends of which, walls are built up about one and a half or two inches thick, composed of small pieces of sifted carbon or well burnt coke, with narrow carbon plates embedded therein, having terminals attached thereto.

Each of these walls is preferably faced with a sheet of celluloid, perforated with as many quarter inch holes as possible and supported by a wood frame. These carbon walls, one at each end of the tank, form the electrodes.

The grain under treatment should be placed in a thin layer, not exceeding seven inches in thickness, at the bottom of the tank, and be well covered with the solution, about eight gallons of which are sufficient for one bushel of grain.

After the treatment of the grain is completed the solution is drawn off from the tank, and the grain is removed and spread in a thin layer on a suitable floor, for the purpose of being sufficiently dried for sowing. The drying is expedited by turning the grain over three or four times per day. In dry weather, the grain thus dried is ready for sowing after two or three days. In damp weather an extra day may be needed.

When large quantities of grain are dealt with, mechanical appliances may be used to effect and hasten the drying by means of currents of air, but artificial heat for that purpose and also direct sunshine should be avoided, otherwise the grain may sprout before being sown and the germs destroyed.

The grain treated should be sound, and of fair quality, especially in the case of wheat, and should be sown as soon as possible, after treatment.

The land on which the grain is sown should be manured and prepared as is customary for ordinary seed grain.

What I claim is:—

1. The process of treating grain consisting of placing the grain in a solution of a manure and passing an electric current through the solution substantially as described.

2. The process of treating grain consisting of placing the grain in a solution of nitric acid and passing an electric current through the solution substantially as described.

HENRY ERNEST FRY.

Witnesses:
CHARLES E. DE WOLF,
O. J. WORTH.